United States Patent Office 3,474,002
Patented Oct. 21, 1969

3,474,002
PROCESS FOR PREPARING THIAMINE
ADENINE DINUCLEOTIDE
Masao Tanaka, Machida-shi, Japan, assignor to Kyowa Hakko Kogyo Co., Ltd., Tokyo, Japan, a corporation of Japan
No Drawing. Filed Mar. 31, 1967, Ser. No. 627,303
Claims priority, application Japan, Apr. 25, 1966, 41/25,864
Int. Cl. C12b 1/00
U.S. Cl. 195—28
13 Claims

ABSTRACT OF THE DISCLOSURE

The present disclosure relates to a process for preparing thiamine adenine dinucleotide by fermentation which comprises culturing a microorganism capable of producing thiamine adenine dinucleotide under aerobic conditions in an aqueous nutrient medium containing thiamine or one of its phosphoric acid esters and adenine or one of the suitable derivatives thereof such as adenine riboside or adenine ribotide. The culturing itself is carried out under conventional conditions. Exemplary microorganisms which may be employed include *Brevibacterium ammoniagenes* and *Corynebacterium glutamicum*.

---

The present invention relates to a process for preparing the adenine dinucleotide of thiamine by fermentation. More particularly, the present invention relates to a process for the preparation of thiamine adenine dinucleotide by fermentation with microorganisms capable of producing the same in a culture medium containing certain additives.

Vitamin $B_1$, i.e., thiamine, is converted to thiamine pyrophosphate in living bodies by the contribution of pyrophosphoric acid from adenosine triphosphate (ATP) by means of the action of thiamine kinase. Thiamine pyrophosphate contributes as a cocarboxylase to many important enzymatic reactions in living bodies such as carboxylase, transketolase, etc. It also performs an important role in the intermediate metabolism of sugars.

Recently, the production of thiamine adenine dinucleotide has been deduced as an intermediate of the biochemical synthesis occurring in the formation of cocarboxylase from thiamine. Thiamine adenine dinucleotide has efficacy in the field of medicine as a co-enzyme. Accordingly, research directed toward finding a method for synthesizing this substance has been carried out, and the various properties of thiamine adenine dinucleotide developed by the synthetic methods obtained have appeared in the prior art. Hence, the prior art describes a method for preparing thiamine adenine dinucleotide wherein thiamine monophosphate and adenosine-5′-monophosphate are coupled at the phosphoric acid position. This is regarded as the most advantageous industrial method for the synthesis of thiamine adenine dinucleotide (Japanese patent publication number 7517/1965). Specifically, this process involves subjecting thiamine monophosphate and adenosine-5′-monophosphate to a dehydrating condensation in an organic solvent using a condensing agent such as dicyclohexylcarbodiimide as a dehydrating and condensing agent. However, this process involves many problems from an industrial point of view such as the fact that thiamine monophosphate and adenosine phosphoric acid esters are not always easily obtainable and, moreover, are not easily synthesized. Moreover, these substances are comparatively unstable and difficult to handle.

Accordingly, one of the objects of the present invention is to provide an improved process for the production of thiamine adenine dinucleotide which overcomes the disadvantages and deficiencies of the prior art methods.

Another object of the present invention is to provide a process for producing thiamine adenine dinucleotide by fermentation which may be carried out in an efficacious and simple manner.

A further object of the invention is to provide a process for the preparation of thiamine adenine dinucleotide by fermentation which may be carried out advantageously on an industrial scale to give a high yield of product.

These and other objects and advantages of the present invention will become apparent to those skilled in the art from a consideration of the following specification and claims.

In accordance with the present invention, it has been found as the result of various studies on a process for preparing the adenine dinucleotide of thiamine by utilizing microorganisms that thiamine adenine dinucleotide is produced and accumulated by culturing microorganisms having the capability of producing thiamine adenine dinucleotide in an aqueous nutrient culture medium containing thiamine or one of its phosphoric esters and adenine or one of its suitable derivatives such as the riboside or ribotide thereof. The thiamine and adenine additives are present in the culture medium at some time during culturing. This simple procedure makes it possible to obtain high yields of thiamine adenine dinucleotide by fermentation and is a fact which has been unknown in the prior art.

Accordingly, the most characteristic point of the present invention is to have thiamine or a phosphate thereof such as thiamine monophosphate and adenine or a derivative thereof such as its riboside or ribotide present in the culture medium at some time during culturing. Thiamine adenine dinucleotide is then effectively produced by culturing microorganisms having the capacity to produce the same in this culture medium.

Either a synthetic culture medium or a natural nutrient medium is suitable in the present invention as long as it contains the essential nutrients for the growth of the microorganism employed. Such nutrients are well known in the art and include substances such as a carbon source, a nitrogen source, inorganic compounds and the like which are utilized by the strain employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as glycerol, sorbitol, organic acids, etc. A single carbon source may be employed or a mixture of two or more, as desired. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen, such as corn-steep liquor, yeast extract, meat extract, peptone, fish meal, casein hydrolysates, casamino acid, fish solubles, rice bran extract, etc., may be employed. As with the carbon source, a single one of these substances or a mixture of two or more may be employed. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. If a particular nutrition requirement is necessary for the strain employed, it is, of course, essential to add the particular materials necessary in order to satisfy the individual nutrition requirement so that the microorganism may grow properly.

To the above culture medium, either thiamine or a phosphate thereof, such as thiamine monophosphate, and either adenine or a suitable derivative thereof, such as adenine riboside or adenine ribotide, are added all at once or intermittently at the proper time during the course of fermentation. If these substances are produced in the culture medium during culturing as a characteristic of the particular strain employed, these compounds are also effectively utilized for the production of thiamine adenine dinucleotide.

The fermentation is conducted under aerobic conditions, such as aerobic shawing of the culture or with stirring with aeration of a submerged culture, at a temperature of about 20° to 40° C. and a pH of about 5.5 to 9.0. After about two to eight days of culturing under these conditions, remarkably large amounts of thiamine adenine dinucleotide are found to be produced and accumulated in the culture liquor.

After the completion of culturing, the thiamine adenine dinucleotide may be separated from the fermentation liquor and recovered by conventional means, such as ion exchange resin treatment, extraction with solvents, precipitation with metallic salts, chromatography, adsorption or the like. The thiamine adenine dinucleotide thus separated and purified has properties in agreement with those reported in the literature for thiamine adenine dinucleotide produced in other ways, such as the physical and chemical constants, elemental analysis, the molar ratios of thiamine, phosphoric acid and adenosine, the infra-red absorption spectrum thereof, etc.

The following examples are given merely as illustrative of the present invention and are not to be considered as limiting. Unless otherwise noted, the percentages therein are by weight.

EXAMPLE 1

*Brevibacterium ammoniagenes* ATCC 6872 is used as the seed bacterium and is cultured at 30° C. for 24 hours in a culture medium comprising 2% of glucose, 1% of peptone, 1% of yeast extract, 0.3% of NaCl and 30 γ/l. of biotin. The resultant seed culture is transplanted into a fermentation culture medium in an amount of 10% by volume. The fermentation culture medium has the following composition:

| | |
|---|---|
| Glucose _____g__ | 100 |
| Urea _____g__ | 6 |
| $K_2HPO_4$ _____g__ | 10 |
| $MgSO_4 \cdot 7H_2O$ _____g__ | 10 |
| $CaCl_2 \cdot 2H_2O$ _____g__ | 0.1 |
| Yeast extract _____g__ | 10 |
| Biotin _____γ/l__ | 30 |

These components, except the urea, are sterilized under a pressure of 1 kg./cm.² for ten minutes. The urea is separately sterilized as a 12% aqueous solution and is added to the aqueous solution of the other components in an amount such that the concentration thereof becomes 6 g./l.

Culturing is then carried out with aerobic shaking of the culture at 30° C. After 72 hours of culturing, 2 mg./ml. of thiamine and of adenine are added to the culture medium. Culturing is continued for another 24 hours, with the result that 0.92 mg./ml. of thiamine adenine dinucleotide is produced and accumulated in the resultant fermentation liquor.

One liter of the fermentation liquor is adjusted to a pH of 7.0 after the removal of the bacterial cells by filtration and is passed through an ion exchange resin column filled with 2 liters of the anion exchange resin Diaion SA21B (Cl type) to adsorb the thiamine adenine dinucleotide. The ion exchange resin column is then eluted with an aqueous solution of 0.001 N hydrochloric acid-0.02 N LiCl after washing the column with 0.001 N hydrochloric acid. As a result, 500 ml. of eluate is obtained. Concentration of this solution under reduced pressure and re-precipitation of the residue from an acetone-methanol mixed solution give 0.71 g. of the lithium salt of thiamine adenine dinucleotide.

Purification of the resultant precipitate by repeated dissolving and precipitation steps gives a product having various physical and chemical constants which are well in accord with the values reported in the literature for thiamine adenine dinucleotide.

EXAMPLE 2

Culturing is carried out in the same manner as described in Example 1 using *Corynebacterium glutamicum* (*Micrococcus glutamicus* ATCC 13032, Japanese patent publication 8698/1957) except that thiamine monophosphate is added to the culture medium instead of thiamine and adenosine is added in the place of adenine 48 hours from the initation of culturing. Both of these substances are added in an amount of 2 mg./ml. to the culture medium. Culturing is carried out for another 24 hours after the said additions, with the result that 0.54 mg./ml. of thiamine adenine dinucleotide is produced and accumulated in the culture liquor.

Recovery and purification thereof, as described in Example 1, give 0.34 g. of the lithium salt of thiamine adenine dinucleotide.

EXAMPLE 3

Culturing is carried out in the same manner as described in Example 1 with the same strain as described in Example 2, except that adenosine-5'-monophosphate is added to the culture medium 72 hours after the beginning of culturing instead of adenine. As in Example 1, thiamine is added to the culture medium at the same time. Each of these substances is added to the culture medium in an amount of 2 mg./ml.

As a result, 1.2 mg./ml. of thiamine adenine dinucleotide is produced and accumulated in the fermentation liquor. Recovery and purification are carried out as described in Example 1 with 1 liter of the fermentation liquor and give 0.75 g. of the lithium salt of thiamine adenine dinucleotide.

It is to be understood that the present invention is not limited to the particular microorganisms specifically set forth in the examples but that other microorganisms capable of producing thiamine adenine dinucleotide may also be employed. Moreover, it is also to be understood that the amount of thiamine and adenine substance added to the culture medium may be varied within wide limits. It has been found advantageous, however, to add an amount ranging from 1 to 5 mg./ml. of each of the substances described herein to the culture medium.

From the above, it can be seen that the present invention provides an extremely advantageous process for producing the highly useful substance thiamine adenine dinucleotide by fermentation.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for producing thiamine adenine dinucleotide which comprises culturing a microorganism capable of producing thiamine adenine dinucleotide and belonging to a genus selected from the group consisting of Brevibacterium, Corynebacterium and Micrococcus under aerobic conditions in an aqueous nutrient medium containing as additives (1) thiamine or a phosphoric acid ester thereof and (2) adenine or a derivative of adenine selected from the group consisting of adenine riboside and adenine ribotide, accumulating thiamine adenine dinucleotide in the resultant culture liquor and recovering the thiamine adenine dinucleotide therefrom.

2. A process for producing thiamine adenine dinucleotide which comprises culturing a microorganism capable of producing thiamine adenine dinucleotide and belonging to a genus selected from the group consisting of Brevibacterium, Corynebacterium and Micrococcus under aerobic conditions at a temperature of approximately 20° to 40° C. and at a pH about 5.5 to 9.0 in an aqueous nutrient medium containing as additives (1) thiamine or a phosphoric acid ester thereof and (2) adenine or a derivative of adenine selected from the group consisting of adenine riboside and adenine ribotide, accumulating thiamine adenine dinucleotide in the resultant culture liquor, and recovering the thiamine adenine dinucleotide therefrom.

3. The process of claim 1, wherein about 1 to 5 mg./ml. of each of said additives is present in the medium.

4. The process of claim 2, wherein about 1 to 5 mg./ml. of each of said additives is present in the medium.

5. The process of claim 1, wherein said microorganism is *Brevibacterium ammoniagenes*.

6. The process of claim 1, wherein said microorganism is *Corynebacterium glutamicum*.

7. The process of claim 1, wherein said phosphoric acid ester is thiamine monophosphate.

8. The process of claim 1, wherein culturing is carried out at a temperature of between approximately 20° and 40° C. and at a pH of about 5.5 to 9.0.

9. The process of claim 2, wherein said microorganism is *Brevibacterium ammoniagenes* ATCC 6872.

10. The process of claim 2, wherein said microorganism is *Micrococcus glutamicus* ATCC 13032.

11. The process of claim 2, wherein said additives are added to the culture medium at the initiation of culturing.

12. The process of claim 2, wherein said additives are added to the culture medium after the initiation of culturing.

13. The process of claim 2, wherein said additives are added intermittently to the culture medium during culturing.

References Cited

UNITED STATES PATENTS 3,232,844  2/1966  Kinoshita et al.
3,268,415  8/1966  Kinoshita et al.
3,359,177  12/1967 Nara et al.

ALVIN E. TANENHOLTZ, Primary Examiner

U.S. Cl. X.R.

260—211.5